United States Patent Office

2,815,765
Patented Dec. 10, 1957

2,815,765

VACUUM-OPERATED RATE OF FLOW CONTROLLER

Samuel L. Adelson, Tucson, Ariz., assignor to Infilco Incorporated, Tucson, Ariz., a corporation of Delaware Application May 17, 1954, Serial No. 430,359

12 Claims. (Cl. 137—205)

This invention relates to a vacuum-operated rate of flow controller, and more particularly to improved means for setting the flow rate and maintaining it at the desired value.

It is an object of this invention to provide an improved vacuum-operated rate of flow controller.

Another object is to provide improved means for setting the flow rate for a vacuum-operated rate of flow controller.

Another object is to provide novel means for maintaining the necessary degree of vacuum in the flow control system.

Another object is to provide a rate of flow controller of the type referred to which has a fast rate of correction from the then flow rate to a newly set flow rate.

Another object is to provide a vacuum-operated rate of flow controller maintaining a flow rate substantially equal to the set flow rate.

Another object is to provide a vacuum-operated rate of flow controller wherein at equilibrium, when the actual flow rate corresponds to the set rate, the vacuum exhausts the air entering the control system as rapidly as it enters.

Other objects of the invention will become apparent upon consideration of the description and of the claims which follow.

Controllers of the type referred to are particularly suited for controlling the effluent from a filter or a gravity ion exchange unit, though they are not limited to these specific applications but are useful wherever it is desired to maintain a predetermined flow rate despite variations in head or pressure upstream of the control device.

The invention will be readily understood by reference to the drawings which form a part hereof and wherein.

Figure 1:
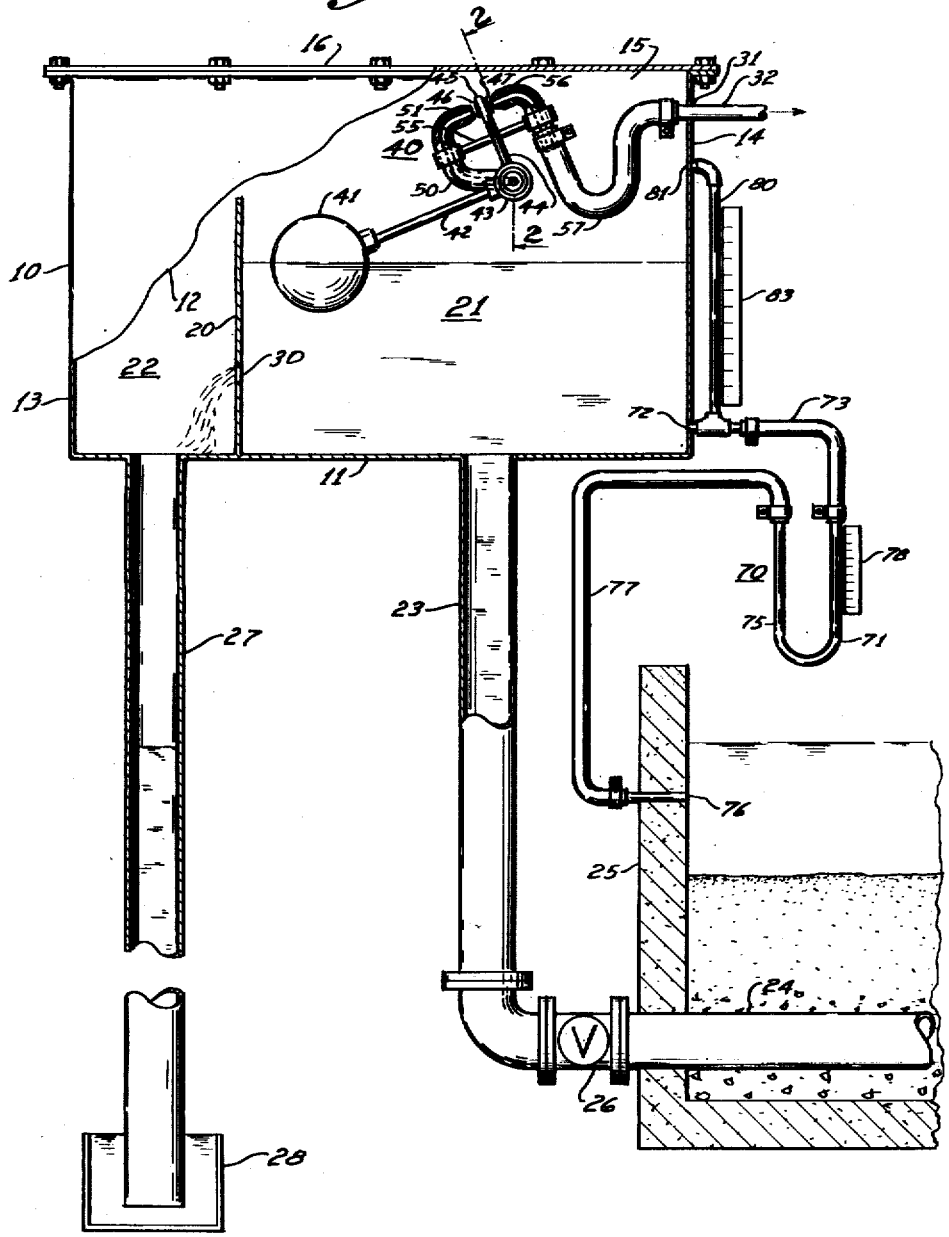
Figure 1 is a front elevation, partly in section, of a controller utilizing the invention.

The controller shown in Figure 1 comprises a casing 10 having a bottom 11, a front wall 12, side walls 13 and 14, and a rear wall 15. The casing 10 is closed by a lid 16 flanged thereto, as shown, to provide an airtight joint with the walls of the casing. The casing 10 is divided by a partition 20 into an inlet compartment 21 and an effluent compartment 22. The inlet compartment 21 is connected by a vertically extending riser pipe 23 to a conduit 24, which is shown for purposes of illustration as the effluent conduit leading from a filter 25 and is provided with a shut-off valve 26. A downtake pipe 27 leads from the outlet compartment 22 of the housing and has its lower end sealed in liquid in a trough or basin 28 of suitable size to prevent air from entering the housing through the downtake pipe 27. The sealing trough 28 discharges to a clear well or the like, not shown.

The partition 20 extends from the bottom 11 to an elevation spaced below the lid 16 and is fitted with an orifice 30. Obviously, other flow-measuring devices, such as a weir, could be used instead of the orifice 30, or the partition 20 and orifice 30 could be replaced by a venturi type flume. Such flow-measuring devices are well known in the art and, therefore, need not be described or illustrated.

The casing 10 has a vacuum port 31, which is connected by a line 32 to a vacuum-creating means, such as a vacuum pump, not shown. An air inlet conduit 33 (Figure 2) extends into the casing 10 through one of its walls, such as wall 12. The conduit 33 is rotatable within a bearing 34, which is fastened to the wall 12 by means of screws 35. A gasket 36 prevents leakage of air into or out of the casing 10 at the bearing 34. The casing is airtight, except for the amount of air permitted to leak into the casing through conduit 33 and the parts connected thereto and described below.

To control the vacuum, and thus the location of the liquid surface in compartment 21, I provide a float valve assembly, generally designated as 40.

Figure 2:
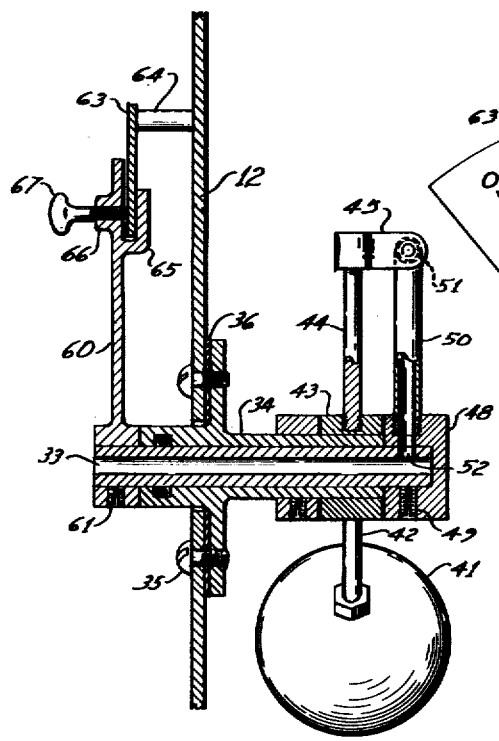
Figure 2 is a vertical sectional view along line 2—2 of Figure 1.
Figure 3:
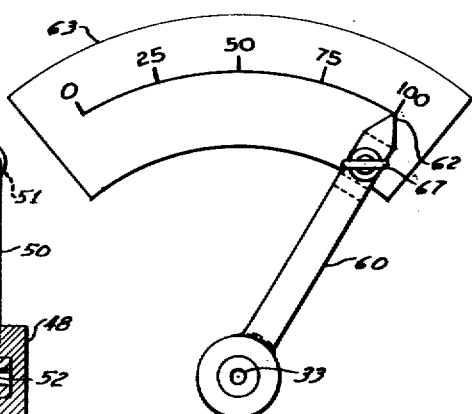
Figure 3 is an elevation of the rate-setting means of the controller seen from a plane facing the dial.

Within the compartment 21 is a float 41. One end of a rod 42 is fixed to the float 41, the other end being fixed to a collar 43 which is free to rotate about the outside of the bearing 34, as shown in Figure 2. Also threaded into the collar 43, at an angle to the rod 42, for example of 90°, is one end of an arm 44. The free end of the arm 44 has an extension 45. Pads 46 and 47 of resilient material, such as rubber, are secured to the two faces of the extension 45.

At one end of the air conduit 33, adjacent the collar 43, is secured a hub 48 by means of a set screw 49. To this hub a hollow tube 50 is secured, as by a thread. The tube 50 carries at its free end a nozzle 51. An opening 52 in the air conduit 33 registers with the inside of the tube 50. Therefore, the nozzle 51 is in direct communication with the atmosphere through tube 50, opening 52, and air conduit 33. Fixed to the tube 50 is a bracket 55 at the other end of which is mounted a vacuum nozzle 56. Nozzle 56 is connected to the vacuum port 31 by means of a flexible conduit 57.

As shown in Figure 1, the extension 45 of arm 44 extends between the nozzles 51 and 56, the nozzles being so located that under equilibrium conditions the gaps between them and pads 46 and 47, respectively, are small.

At the other end of the air conduit 33 is secured one end of a lever 60 by means of a set screw 61. The other end of lever 60 terminates at a pointer 62, which registers with the numbers of a dial 63. The dial 63 is fastened to wall 12 of the casing 10 by any suitable means, such as a bracket 64. Intermediate the two ends of lever 60 is an anglelike extension 65 which engages the rear of the dial 63. Also at this location on the lever 60 is a threaded hub 66 with a thumb screw 67 so that the lever 60 may be held fast in any position it may be set.

When the controller is used with a filter, such as indicated at 25 of Figure 1, a manometer 70 can be used to indicate the loss of head in the filter. One leg 71 of the manometer 70 is connected to the compartment 21 at a position below the minimum liquid level therein, as at 72 by a pipe 73. The other leg 75 is connected to the filter 25 below the minimum liquid level, as at 76 by a pipe 77. The mercury level in leg 71 registers with a scale on a dial 78 to indicate the loss of head in the filter.

A transparent tube 80 may be connected at its low end to the compartment 21 at 72 and have its upper end connected to the compartment 21 above the maximum liquid level, as at 81. The liquid level in transparent tube 80 registers with the scale on a dial 83 to show the height of liquid above the orifice 30, and hence the rate of flow through the orifice.

The operation of the rate of flow controller will be readily understood. To set the control for a certain rate, the thumb screw 67 is loosened, the lever 60 moved so that the pointer 62 registers with a mark on the dial 63, indicating the desired flow rate, and the thumb screw 67 tightened to fix the lever 60 in this position.

When there is no flow through the controller, the weight of the float 41 positions the arm 44 so that pad 46 closes the discharge opening of the air nozzle 51 to shut off the interior of casing 10 from the outside atmosphere. At the same time the gap between the pad 47 and the vacuum nozzle 56 will be increased and the interior of the casing 10 be opened to the vacuum. As the vacuum builds up in the housing 10, the water rises in conduit 23 and enters compartment 21 and continues to rise therein until it reaches the elevation where the float 41 is sufficiently submerged to be raised. Raising of the float 41 rotates arm 44 to move pad 46 away from nozzle 51 and pad 47 towards nozzle 56. The water continues to rise and to raise the float until the liquid surface has reached the predetermined elevation over the orifice 30 corresponding to the rate of flow set by pointer 62 on dial 63. At this equilibrium condition the gaps between the pads 46 and 47 and the nozzles 51 and 56, respectively, are such that the incoming air is exhausted through nozzle 56 as rapidly as it enters through the nozzle 51.

At the beginning of a filter run, when the loss of head through the filter is at a minimum, the liquid level in chamber 21 will tend to rise above the predetermined elevation. Immediately, however, the float 41 also rises, moving the pad 46 away from the air nozzle 51 and pad 47 nearer to vacuum nozzle 56, so that more air can enter the casing and the vacuum is practically shut off. Thus, the vacuum in the casing 10 is reduced until the upstream head, plus the vacuum, again results in a force just sufficient to lift the liquid to the predetermined elevation. Similarly, as the filter 25 is becoming increasingly clogged toward the end of the run, the liquid surface in the chamber 21 will tend to drop and the float 41 will move the pad 46 nearer to the air inlet nozzle 51 and the pad 47 away from the vacuum nozzle 56. Consequently, the vacuum in casing 10 will build up until the increased vacuum, plus the decreased upstream head, will again provide a force just sufficient to lift the liquid to the predetermined level corresponding to the flow rate set by arm 60 on dial 63.

If the controller is operating at a certain flow rate and it is desired to increase the flow rate, the pointer 62 on lever 60 is set at the new higher rate, up scale. Moving lever 60 in this direction will rotate air conduit 33 and the nozzles 51 and 56 affixed thereto to close the gap between pad 46 and air nozzle 51 and widen the gap between pad 47 and vacuum nozzle 56. The vacuum will then build up to raise the water level in compartment 21 and the float 41. With the upward movement of float 41 the gap between pad 46 and air nozzle 51 will increase, and the gap between pad 47 and vacuum nozzle 56 will decrease, until equilibrium is established, with the liquid level resulting in the desired flow rate through the orifice 30.

If the controller is operating at a certain rate and it is desired to decrease this rate, lever 60 is set at the new rate, down scale. This will close the gap between pad 47 and vacuum nozzle 56 and increase the gap between pad 46 and air nozzle 51. The vacuum will then be substantially shut off, while air from the outside will enter at an increased rate. This will reduce the vacuum, thereby lowering the liquid level in compartment 21.

In moving the lever 60 towards the lower rate mark on the dial 63, the vacuum nozzle 56 will contact its pad 47 and force the float 41 into the liquid to a greater extent. The increased buoyant effect of the float will then keep the gap between pad 47 and vacuum nozzle 56 closed until the liquid level has receded sufficiently so that the float 41 will just ride on the liquid level and keep the gaps between nozzles 51 and 56 and pads 46 and 47, respectively, at the proper size so that air is exhausted from the housing 10 as fast as it enters.

The liquid level in the transparent tube 80 is an indicator for the actual rate of flow which must agree with the rate set by the pointer 62 on dial 63.

Figure 4:
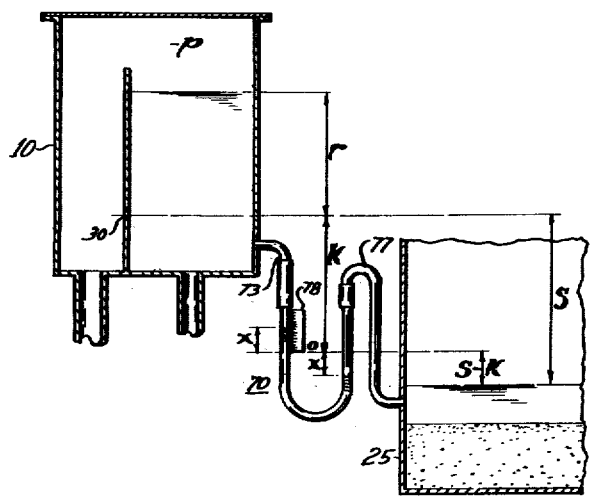
Figure 4 is a diagrammatic showing of the indication of the loss of head through the filter by the manometer of Figure 1.

While any suitable loss of head gauge can be used, the manometer 70 provides simple means for indicating the loss of head through the filter 25. Figure 4 shows diagrammatically how manometer 70 indicates the loss of head through the filter.

The manometric fluid is mercury having a specific gravity of 13.6, the specific gravity of water being taken as 1.0. The pressure existing at the level corresponding to the surface level of the mercury in the right hand leg of manometer 70, as seen in Figure 4, is as follows:

The negative pressure $-p$ in inches of water, plus the water head $r$, plus the water head $(k-x)+2x$ times 13.6; or expressed mathematically:

$$-p+r+(k-x)+27.2x$$

Again the pressure at the same level equals $x$ inches of water (acting downward) minus $(s-k)$ inches of water acting upward; or, expressed mathematically:

$$x-(s-k)$$

therefore $$-p+r+k-x+27.2x=x-(s-k)$$

Now the pressure $p$ acting upward must equal the water head $r+s+l$, where $l$ is the loss of head in the filter in inches of water; therefore $$-r-s-l+r+k+25.2x=k-s$$

or $$l=25.2x \text{ inches}$$

For the loss of head L in feet we have $$L=\frac{l}{12}=\frac{25.2x}{12}=2.1x$$

The interlacing of the action of the rate-setting means in positioning the air and vacuum nozzles with the action of the float in positioning the nozzle-closing members results in an immediate and accurate response to a change in the set rate of flow, as well as fast correction of any digression of the actual rate of flow from the set rate due to a change in the upstream head.

I claim:

1. In a vacuum-operated rate of flow controller including an airtight casing having liquid inlet means and liquid outlet means, and a flow-measuring device interposed between said inlet means and said outlet means, a pair of spaced nozzles supported in said casing and facing each other in axial alignment, one of said nozzles being connected to atmosphere and the other being adapted for connection to a source of vacuum, a nozzle-closing element interposed between, and normally spaced from, both said nozzles so that air entering said casing through the nozzle connected to atmosphere is exhausted through the nozzle connected to a source of vacuum at the rate it enters, said element being positionable to move toward either nozzle and simultaneously move away from the other nozzle, and a member responsive to variations in the liquid level in said casing, and operative to position said nozzle-closing element to vary the gaps between said element and said nozzles in accordance with variations in the liquid level.

2. In a vacuum-operated rate of flow controller including an airtight casing having liquid inlet means, liquid outlet means, a flow-measuring device interposed between said inlet means and said outlet means, a vacuum port in said casing adapted to be connected to a source of vacuum, and an air inlet port in said casing, a float valve assembly for said ports comprising a pair of spaced nozzles facing each other in axial alignment, one of said nozzles being connected to said vacuum port and the other to said air inlet port, an element interposed between, and normally spaced from, both said nozzles such that air entering through said one nozzle is exhausted through the other at the rate at which it enters, and positionable to close either nozzle, and a member responsive to variations in the liquid level in said casing, and operative to position said nozzle-closing element so that it moves toward one of said nozzles and simultaneously moves away from the other to vary the gaps between said element and said nozzles.

3. In a vacuum-operated rate of flow controller including an air-tight casing having liquid inlet means, liquid outlet means, a flow-measuring device interposed between said inlet means and said outlet means, a vacuum port in said casing adapted to be connected to a source of vacuum, and an air inlet port in said casing, a float valve assembly for said ports comprising a pair of spaced nozzles facing each other in axial alignment, one of said nozzles being connected to said vacuum port and the other to said air inlet port, a nozzle-closing element interposed between, and normally spaced from said nozzles such that air entering through said one nozzle is exhausted through the other at the rate at which it enters, an arm supporting said nozzle-closing element, a rotatable member supported in said casing, the free end of said arm being rigidly affixed to said rotatable member, and a float rigidly connected to said rotatable member, whereby said nozzle-closing element is moved by said arm in accordance with movement of said float to approach one of said nozzles and simultaneously recede from the other nozzle.

4. In combination with a vacuum-operated rate of flow controller including an airtight casing having liquid inlet means, liquid outlet means, a flow-measuring device interposed between said inlet means and said outlet means, a vacuum port in said casing adapted to be connected to a source of vacuum, and air inlet means to said casing, means for setting and for maintaining a desired rate of flow, comprising a pair of axially aligned nozzles facing each other and spaced from, and rigidly affixed to, each other for movement in unison, one of said nozzles being connected to said vacuum port and the other nozzle being connected to said air inlet means, a nozzle-closing member interposed between said nozzles, a member responsive to variations in the liquid level in said casing, and operative to position said nozzle-closing element to vary the gaps between said element and said nozzles in accordance with variations in the liquid level, a rate-setter arm outside said casing, and means for transmitting the movements of said rate-setter arm to said nozzles to vary the gaps between said nozzles and said nozzle-closing element in accordance with the set rate of flow.

5. In combination with a vacuum-operated rate of flow controller including an airtight casing having liquid inlet means, liquid outlet means, a flow-measuring device interposed between said inlet means and said outlet means, a vacuum port in said casing adapted to be connected to a source of vacuum, and air inlet means to said casing, means for setting and for maintaining a desired rate of flow, comprising a pair of axially aligned nozzles spaced from, and rigidly affixed to, each other for movement in unison, said nozzles facing each other, one of said nozzles being connected to said vacuum port and the other nozzle being connected to said air inlet means, a nozzle-closing member interposed between said nozzles, an arm supporting said nozzle-closing member, a rotatable member supported in said casing, the free end of said arm being rigidly affixed to said rotatable member, a float connected to said rotatable member, said nozzle-closing member being positioned by movement of said float to move a proportional distance toward one of said nozzles and simultaneously an equal distance away from the other nozzle, a rate-setter arm outside said casing, and means for transmitting the movements of said rate-setter arm to said nozzles to position said nozzles relative to said nozzle-closing member in accordance with the set rate of flow.

6. In a vacuum-operated rate of flow controller including an airtight casing having liquid inlet means, liquid outlet means, a flow-measuring device interposed between said inlet means and said outlet means, a vacuum port in said casing adapted to be connected to a source of vacuum, and air inlet means to said casing, means for maintaining a desired rate of flow, comprising a pair of spaced axially aligned nozzles mounted in said casing so as to face each other, one of said nozzles being flexibly connected to said vacuum port and the other nozzle being connected to said air inlet means, a nozzle-closing member interposed between said nozzles, the gaps, at equilibrium, between said nozzles and the nozzle-closing member being such that air is exhausted through the vacuum nozzles as fast as it enters through the air nozzle, and means for positioning said nozzle-closing member from variations in the liquid level in said casing comprising an arm supporting said nozzle-closing member, a rotatable member supported in said casing, the free end of said arm being rigidly affixed to said rotatable member, and a float rigidly connected to said rotatable member, whereby said nozzle-closing member is positioned by movement of said float to move toward the air nozzle and simultaneously away from the vacuum nozzle when the liquid level drops below a predetermined elevation, and to move toward the vacuum nozzle and away from the air nozzle when the liquid level rises above said predetermined elevation.

7. The apparatus of claim 6, including also rate-setting means outside said casing, and means for transmitting the movements of said rate-setting means to said nozzles, said nozzles being rigidly connected to move in unison in response to movement of said rate-setting means.

8. In combination with a vacuum-operated rate of flow controller of the type described, a rotatably supported air inlet conduit, an air nozzle communicating with, and positionable by rotation of, said conduit, a vacuum nozzle axially aligned with, and rigidly connected to, said air nozzle in facing and spaced relationship, said vacuum nozzle being adapted for connection to a source of vacuum, a rate-setter arm affixed to said air inlet conduit and adapted to rotate said conduit through an angle, an element interposed between said nozzles and adapted to be moved in contact with either nozzle, and a member responsive to variations in the liquid level in said controller and positioning said element by its movement to decrease the gap between said air nozzle and said element when the liquid level is below a predetermined elevation and to simultaneously increase the gap between said element and the vacuum nozzle and, vice versa, to increase the gap between said air nozzle and said element and simultaneously decrease the gap between said vacuum and the element when the liquid level is above the predetermined elevation.

9. A vacuum-operated rate of flow controller including an airtight casing having liquid inlet means and liquid outlet means and a flow-measuring device interposed between said inlet means and said outlet means, characterized by a rotatable air inlet conduit extending into said casing, a hollow tube affixed to said inlet conduit and communicating with the interior of said conduit, an air nozzle mounted on said tube, a vacuum nozzle axially aligned with, and rigidly affixed to, said air nozzle in facing and spaced relationship thereto and adapted for connection to a source of vacuum, a nozzle-closing element interposed between said nozzle, a rate-setter arm affixed to said conduit outside said casing, movement of said rate-setter arm to set a rate rotating said conduit to position said nozzles with respect to said nozzle-closing element, a rotatable member supporting said nozzle-closing element, and a float affixed to said rotatable member, movement of said float in response to changes in the liquid level in said casing rotating said rotatable member to position said nozzle-closing element with respect to said nozzles to move a proportional distance toward one of said nozzles and move away an equal distance from the other nozzle.

10. In a vacuum-operated rate of flow controller including an air-tight casing having liquid inlet means, liquid outlet means, and a flow-measuring device interposed between said inlet means and said outlet means, a pair of nozzles supported in said casing, one of said nozzles being adapted for connection to atmosphere and the other being adapted for connection to a source of vacuum, nozzle-closing means normally spaced from said nozzles in such manner that air entering the casing through said one nozzle is exhausted through the other nozzle at the rate at which it enters, said nozzle-closing means being positionable to move toward one of said nozzles and simultaneously to move away from the other nozzle, and a member responsive to variations in the liquid level in said casing and operative to position said nozzle-closing means to increase the gap between said nozzle-closing means and said one nozzle and simultaneously decrease the gap between said nozzle-closing means and said other nozzle when the liquid level in said casing rises above a predetermined elevation, and vice versa when the liquid level falls below said predetermined elevation.

11. In combination with a vacuum-operated rate of flow controller including an air-tight casing having liquid inlet means, liquid outlet means, and a flow-measuring device interposed between said inlet means and said outlet means, means for setting and for maintaining a desired rate of flow comprising a pair of nozzles in said casing and rigidly affixed to each other for movement in unison, one of said nozzles being adapted for connection to a source of vacuum and the other nozzle being connected to atmosphere, nozzle-closing means adjacent but normally spaced from said nozzles so that air entering the casing through said one nozzle is exhausted through the other at the rate at which it enters, said nozzle-closing means being movable relative to said nozzles, a member responsive to variations in the liquid level in said casing and operative to position by its movement said nozzle-closing means with respect to said nozzles in such manner that the gap between the nozzle-closing means and one nozzle increases while the gap between the nozzle-closing means and the other nozzle decreases the same amount, a rate-setter arm outside said casing, and means for transmitting the movements of said rate-setter arm to said nozzles to move said nozzles relative to said nozzle-closing means.

12. In combination with a vacuum-operated rate of flow controller of the type described, a rotatably supported air inlet conduit, an air nozzle communicating with, and positionable by rotation of, said conduit, a vacuum nozzle rigidly connected to said air nozzle, said vacuum nozzle being adapted for connection to a source of vacuum, a rate-setter arm affixed to said air inlet conduit and adapted to rotate said conduit through an angle, a pair of nozzle-closing elements normally spaced from said nozzles and adapted to be moved in contact with said nozzles, and a member responsive to variations in the liquid level in said controller and positioning by its movement said nozzle-closing elements with respect to said nozzles to move one nozzle-closing element toward its nozzle and simultaneously to move the other nozzle-closing element a corresponding distance away from its nozzle.

References Cited in the file of this patent
UNITED STATES PATENTS

| 1,202,050 | Gamble | Oct. 24, 1916 |
| 1,555,082 | Serrell | Sept. 29, 1925 |
| 2,065,702 | Hubbard | Dec. 29, 1936 |

U. S. DEPARTMENT OF COMMERCE
PATENT OFFICE
CERTIFICATE OF CORRECTION

Patent No. 2,815,765                                               December 10, 1957

Samuel L. Adelson

It is hereby certified that error appears in the printed specification of the above numbered patent requiring correction and that the said Letters Patent should read as corrected below.

Column 6, line 19, for "nozzles" read --nozzle--; line 56, after "vacuum" insert --nozzle--; line 70, for "nozzle" read --nozzles--.

Signed and sealed this 4th day of March 1958.

(SEAL)
Attest:
KARL H. AXLINE
Attesting Officer

ROBERT C. WATSON
Commissioner of Patents